Aug. 7, 1956 R. B. DOME 2,758,159
VIDEO FREQUENCY AMPLIFIER
Filed March 27, 1953
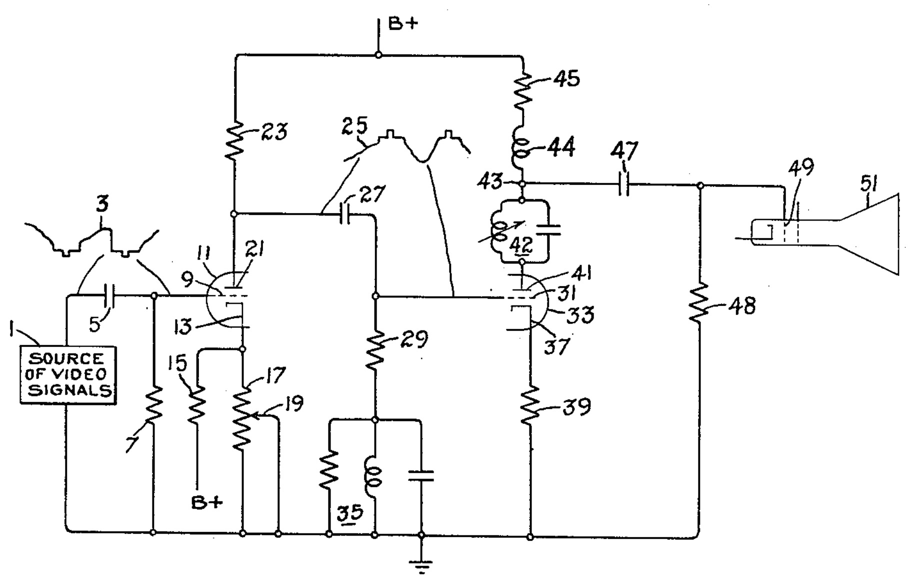
Inventor:
Robert B. Dome,
by Charles M. Hutchins
His Attorney.

United States Patent Office 2,758,159
Patented Aug. 7, 1956

2,758,159

VIDEO FREQUENCY AMPLIFIER

Robert B. Dome, Geddes Township, Onondaga County, N. Y., assignor to General Electric Company, a corporation of New York Application March 27, 1953, Serial No. 345,110

1 Claim. (Cl. 179—171)

This invention relates to a video frequency amplifier of the A.-C. coupled type.

It has been recognized by those skilled in the art that television frequency amplifiers designed for use with the standard U. S. television signals may be A.-C. coupled when the synchronizing pulses of the composite television signal are negative, but that precaution must be taken when the synchronizing pulses are positive. The reason for this is that impulse noise voltages generally extend in the same direction as the synchronizing pulses and, when presented to the grid of a tube via a conventional condenser and grid leak coupling circuit, they can sometimes block the tube by developing high bias voltages owing to the rectification of the noise pulses by the grid-cathode path within the tube. The bias thus developed may so influence the transmission of the picture information represented by the video signals immediately following the noise pulse that they may be momentarily obliterated or, in some instances, may be amplified with such decrease in level as to cause momentary white flashes in the picture.

Previous solutions to this problem have included the use of D.-C. coupling for those stages of the video amplifier where the synchronizing pulses are positive so that no condenser is present and available for charging. Another solution has been to provide amplitude limiting circuits ahead of the amplifier and enough fixed bias for the amplifier so that noise pulses do not appear at the amplifier grid with sufficient amplitude to cause it to draw grid current, and thereby produce rectification which could charge the coupling condenser.

Both of these solutions are subject to some limitations. The D.-C. coupled amplifier does not make efficient use of the high voltage plate supply because the tubes forming the amplifier are effectively connected in series across this supply, thereby necessitating the operation of the last stage at something less than the full supply voltage. The available signal amplitude appearing at the output of the amplifier is, therefore, reduced from that which might be available if the full plate supply voltage had been used. The system employing a limiter and fixed bias of the amplifier is also limited in that it requires that the amplifier have twice the range needed for the video signal in order to accommodate the noise pulse. Accordingly, a tube having a comparatively high output range must be used.

It is the object of the present invention to provide an improved A.-C. coupled video amplifier that is substantially free from the effects of noise impulses even though these pulses may be coupled in the positive polarity to the grid of one of the amplifying stages.

Ordinarily, in A.-C. coupled video amplifiers the coupling condenser is of the order of 0.01 to 0.1 mfd. and the grid leak resistor is of the order of 1 megohm. However, in accordance with the principles of this invention, the resistance of the grid leak resistor is reduced to a value that is much less than that normally used. The capacitance of the coupling condenser is then established at a value such that the desired frequencies are passed without undue attenuation. The resistance of the grid leak resistor is of the same order of magnitude as the grid-cathode resistance of the amplifier tube involved. Purely by way of example and not by way of limitation the coupling condenser could have a capacitance of 5 microfarads and the grid leak resistor could have a resistance as low as 820 ohms.

As will be understood from the discussion below, the use of a coupling condenser having a larger than normal capacitance and a grid leak resistor having less than normal resistance permits the amplifier to be operated in the positive grid region and thus extends the peak-to-peak output appreciably.

Accordingly, it is a further object of the invention to provide a video amplifier that is capable of operating with acceptable linearity in the positive grid region and of producing output voltages having a greater peak-to-peak value.

The details of one way of attaining these objectives in accordance with the principles of the invention may be better understood after a consideration of the following description of the accompanying drawing:

A source 1 which may be comprised of a second detector of a receiver supplies video signals in which the synchronizing pulses are negative as indicated in the wave form 3. These signals are coupled by the usual coupling condenser 5 and a grid leak resistor 7 to a grid 9 of an electron discharge device 11. The electron discharge device 11 may be part of a dual triode, as shown, or it may be a separate tube. The cathode 13 of the electron discharge device 11 is connected to the junction of resistors 15 and 17 that are connected in series between a source (not shown) of B+ potential and reference potential, here shown as ground. A variable grounded tap 19 is adjusted to ride on the resistor 17 so as to vary the positive bias placed on the cathode 13 and at the same time vary the cathode-to-ground resistance to control the amount of negative feedback and hence vary the over-all gain of the electron discharge device 11. The tap 19 thus operates as a gain or contrast control. The resistor 15 operates to provide some fixed bias in addition to any self-bias that may be developed when the gain control tap 19 is set at the lower end of the resistor 17 which, of course, is a point of minimum gain. The plate 21 of the electron discharge device 11 is connected to a source (not shown) of B+ potential via a plate load resistor 23. Thus the electron discharge device 11 operates as a first stage of the video amplifier and supplies a video signal at its plate which, as indicated by the wave 25, has positive synchronizing pulses.

The plate 21, at which the output of the first stage of video amplification appears, is coupled by a condenser 27 and a grid leak resistor 29 to the grid 31 of a second electron discharge device 33. The lower end of the grid leak resistor 29 may be connected to the reference potential via a high frequency compensation circuit 35. The cathode 37 of the electron discharge device 33 may be connected to the reference potential via a biasing resistor 39 that serves to prevent excessive non-linearity on the positive peaks of the signal applied to the grid 31. Thus the coupling condenser 27 is coupled between the plate 21 of the first video amplifier stage and the grid 31 of the second video amplifier stage, and the grid leak resistor 29 is coupled between the grid 31 and the cathode 37 of the second amplifier stage.

The coupling condenser, as pointed out above, normally has a capacitance in the order of 0.01 to 0.1 mfd. and the grid leak resistor 29 has a resistance that is normally in the order of one half or one megohm. In accordance with the principles of this invention the resistance of the grid leak resistor 29 is greatly reduced from the value normally used. The capacitance of the coupling condenser 27 is greatly increased over that normally used in order to accommodate the frequencies involved. Furthermore, for reasons which will be subsequently explained, the resistance of the grid leak resistor 29 is of the same order of magnitude as the space resistance between the grid 31 and the cathode 37 of the electron discharge device 33 when the device is drawing grid current.

A trap circuit 42, tuned so as to block the beat frequency between the video and audio carriers may be inserted between the plate 41 of the electron discharge device 33 and a terminal 43. A load impedance for the electron discharge device, comprising an inductance 44 and a resistor 45, is connected between the terminal 43 and a source of B+ voltage. A coupling condenser 47 and a grid leak resistor 48 serve to couple the terminal 43 to a control grid 49 of a cathode ray tube 51.

The following discussion presents a comparison between an A.-C. coupled amplifier wherein the coupling condenser 27 and the grid leak resistor 29 have the normal values and a video amplifier wherein these components have values that are greater and less than normal respectively in accordance with the principles of this invention.

Ordinarily trouble might be expected in the grid circuit of a tube when conventional components are employed. For example, if the coupling condenser 27, hereinafter referred to as $C_{27}$ were in the order of 0.01 to 0.1 mfd., and the grid leak resistor 29, hereinafter referred to as $R_{29}$, were 1 megohm, a situation exists whereby noise pulses can charge $C_{27}$ practically up to the peak amplitude of the noise.

The principle which is employed to circumvent this situation in accordance with the invention is to increase the capacitance of $C_{27}$ to a substantially larger value and to decrease the resistance of $R_{29}$ to a substantially smaller value. For example, it has been found that $C_{27}$ may be in the order of several microfarads and that $R_{29}$ may be in the order of a thousand ohms. Further advantages are realized if the grid-to-cathode resistance of the device 33 is comparable to the resistance of $R_{29}$. The differences in performance of an amplifier under condition I, when normal values are assigned to $C_{27}$ and $R_{29}$ and under condition II, when the values of $C_{27}$ and $R_{29}$ are selected in accordance with the principles of this invention will now be calculated. Let the grid-to-cathode conductive resistance of the electron discharge device 33 be assumed to be 1000 ohms, also assume that the duty cycle of the pulses be 10%, which corresponds to rather severe impulse noise, and which also corresponds approximately to the duty cycle of the synchronizing pulses themselves. Now let the grid be driven positive by .05 volt. In condition I, $R_{29}=1$ megohm, the peak grid current becomes $$I_{g\,\text{peak}}=\frac{E+}{r_g}=\frac{0.05}{1000}=5\times10^{-5}\text{ amperes} \qquad (1)$$

But the average current, because of the 10% duty cycle is $$I_{g_{avg}}=0.1(5\times10^{-5})=5\times10^{-6}\text{ amperes} \qquad (2)$$

Therefore, the bias developed will be $$E_c=I_{g_{avg}}\times R_{29}=5\times10^{-6}\times10^{6}=5\text{ volts} \qquad (3)$$

The peak-to-peak signal is, therefore, $0.05+5=5.05$ volts (4)

Now in case II (where $C_{27}=5$ mfd. $R_{29}=820$ ohms), $$I_{g_{pk}}=\frac{E+}{r_g}=\frac{0.05}{1000}=5\times10^{-5}\text{ amperes} \qquad (5)$$

The average current is $$I_{g_{avg}}=0.1(5\times10^{-5})=5\times10^{-6}\text{ amperes} \qquad (6)$$

Therefore, the bias developed is $$E_c=I_{s\,avg}\times R_{29}=5\times10^{-6}\times820=0.0041\text{ volts} \qquad (7)$$

The peak-to-peak signal is, therefore, $$0.05+0.0041=0.0541\text{ volts} \qquad (8)$$

Now this voltage is admittedly much less than that of Equation 4, so, in order to compare the results on an equal input signal, the levels in condition II should be multiplied by $$a=\frac{5.05}{0.0541}=93 \qquad (9)$$

Thus for condition II

The grid is driven positive by $$93\times0.05=4.67\text{ volts} \qquad (10)$$

The bias developed is $93\times0.0041=0.38$ volts (11)

The total signal is $4.67+0.38=5.05$ volts (12)

This is seen to be in agreement with the signal voltage of condition I as given by Equation 4.

The important conclusion is, then, that the bias developed in II of only 0.38 volt for an input signal of 5.05 volts means that the amplifier is very difficult to block. If $R_{23}$ is properly selected, limiting in electron discharge device 11 may be effected so that no more than 5 volts can be developed at the grid of the electron discharge device 33, thereby providing complete protection.

It will be noted that the ratio of biases developed for the same signal for the two conditions is $$\frac{E_{c_{II}}}{E_{c_I}}=\frac{0.38}{5.00}=0.076 \qquad (13)$$

An equation may be developed for obtaining this result directly. It is $$\frac{E_{c_{II}}}{E_{c_I}}=\frac{\dfrac{1}{R_{29_I}}+\dfrac{\delta}{r_g}}{\dfrac{1}{R_{29_{II}}}+\dfrac{\delta}{r_g}} \qquad (14)$$

where $r_g$=tube grid-cathode internal resistance
$\delta$=duty cycle
$R_{29_I}$=high resistance grid leak
$R_{29_{II}}$=low resistance grid leak The capacitance of $C_{27}$ is made large enough to provide satisfactory low frequency response. It has been found that 5 mfd. is satisfactory when $R_{29}$ is 820 ohms. An electrolytic condenser has been employed for this purpose. The D.-C. leakage, unless it is very high, should cause no trouble because $R_{29}$ is too low to permit any significant positive bias to be developed at the grid of tube 33.

During the portions of video signals applied that do not cause the grid 31 to draw current, the load impedance presented to the electron discharge device 11 is substantially the resistance of the grid leak resistor 29. During the portions of video signal that cause the grid 31 to draw current the load impedance presented to the electron discharge device 33 is substantially the grid-cathode resistance shunted by resistance $R_{29}$. Inasmuch as the resistance of the grid leak resistor 29 is of the same order of magnitude as the grid-to-cathode resistance of the electron discharge device 33, the load impedance effectively presented to the electron discharge device 11 is substantially the same regardless of whether or not the grid 31 is drawing current. Therefore, the electron discharge device 33 may be operated in the positive grid region without undue compression of the more positive portions of the signals applied to it.

The following list of values of the various circuit components is presented in order to enable one skilled in the art to practice the invention more easily. However, it is not intended that the invention be restricted to the particular values designated.

$C_5$=.05 mfd.
$R_7$=1 megohm
$R_{15}$=180 K∼
$R_{17}$=3 K∼
$R_{23}$=33 K∼
$C_{27}$=5 mfd.
$R_{29}$=820 ohms
$R_{39}$=82 ohms
$L_{44}$=425 microhenries
$R_{45}$=5600 ohms
$C_{47}$=0.1 mfd.
$R_{48}$=1 megohm
Electron discharge devices 11 and 33—12AT7

While I have illustrated a particular embodiment of my invention, it will of course be understood that I do not wish to be limited thereto since various modifications both in the circuit arrangement and in the instrumentalities may be made, and I contemplate by the appended claims to cover any such modifications as fall within the true spirit and scope of the invention.

What I claim as new and desire to secure by Letters Patent of the United States is:

A video amplifier stage adapted to respond to video signals in which the synchronizing signals are positive comprising in combination an electron discharge device having a grid, a cathode and a plate, a load impedance connected to said plate, a coupling condenser connected to said grid, and a grid leak resistor coupled between said grid and cathode, the resistance of said grid leak resistor being of the same order of magnitude as the cathode grid resistance when grid current is being drawn and the capacitance of said coupling condenser being sufficient to pass the lowest frequencies desired.

References Cited in the file of this patent

UNITED STATES PATENTS

| | | |
|---|---|---|
| 2,122,990 | Poch | July 5, 1938 |
| 2,124,211 | Van B. Roberts | July 19, 1938 |
| 2,178,340 | Geiger | Oct. 31, 1939 |
| 2,550,831 | Kerkhof | Mar. 14, 1950 |